Patented Oct. 4, 1932

1,881,282

UNITED STATES PATENT OFFICE

WALTER E. LAWSON AND LLOYD T. SANDBORN, OF WILMINGTON, DELAWARE, ASSIGNORS TO E. I. DU PONT DE NEMOURS & COMPANY, OF WILMINGTON, DELAWARE, A CORPORATION OF DELAWARE

PROCESS OF POLYMERIZING VINYL DERIVATIVES

No Drawing. Application filed September 22, 1928. Serial No. 307,775.

This invention relates to the art of polymerization, and more particularly, to the process of producing soluble polymers of vinyl derivatives.

It has heretofore been proposed to polymerize various vinyl derivatives such as vinyl acetate by heat but the resulting polymers have shown an objectionable tendency toward insolubility thus rendering them less useful particularly as constituents of coating compositions.

We have found that if the polymerization is carried out in the presence of suitable solvents it is possible to overcome these objectionable tendencies, which manifest themselves in the case of certain vinyl derivatives by a complete insolubility of the resulting polymers in the usual solvents, and in others by a tendency toward insolubility evidenced by the formation of filaments of resin when these derivatives are used in spraying lacquers, the latter tendency being referred to herein as cobwebbing.

It is therefore an object of this invention to prevent the formation of insoluble gels or polymers when vinyl derivatives are polymerized.

It is another object of this invention to so polymerize vinyl derivatives that they will not cobweb when used in spraying lacquers.

With the above and other objects in view which will be apparent as the description proceeds, we have set forth our invention in the following specification and have included the following examples by way of illustration and not as a limitation.

Example 1

A solution of 3900 grams of 21.7% styrene (vinyl benzene) in ethyl benzene and containing 8 grams of benzoyl peroxide was heated for 5 hours at 115–120° C. The polymerization mixture was steam distilled giving 3272 grams of volatile liquid and 477 grams of meta styrene. The recovery of materials was 96.1% and 56.4% of the styrene was polymerized. The meta styrene was ground and dried for 24 hours at room temperature, followed by 24 hours' drying in an oven at approximately 65° C. A 25% solution of this resin, in a solvent mixture containing the aromatic hydrocarbons, benzene, toluene, and xylene, sprayed without cobwebbing.

Example 2

A solution of 900 g of vinyl acetate and 4.5 g of benzoyl peroxide in 600 g of toluene is made up and a 100 g portion placed in a 3—liter flash fitted with a reflux condenser and immersed in a water bath heated to 85–100° C. As soon as the reaction commences the balance of the solution is slowly added through a dropping funnel at a rate sufficient to maintain control of the reaction. Eight to ten hours are usually required for this addition. The reaction mixture is further heated for four hours after the addition has been completed. The toluene and unpolymerized vinyl acetate are removed by distillation under reduced pressure if a light colored product is desired. If the toluene is removed by conducting the distillation at atmospheric pressure, a yellow colored resin is obtained, the depth of color varying with the amount of heating. The yield of polymer is approximately 89% of the theoretical. This resin dissolved in suitable solvents such as a mixture of butyl acetate and ethyl acetate will show no cobwebbing when sprayed under conditions usually employed in the spraying of lacquers or enamels. On the other hand a resin prepared in identically the same way but omitting the toluene will be found to cobweb very badly when sprayed under similar conditions.

Example 3

Instead of using toluene as the diluent we may employ butyl acetate. We have polymerized a mixture of 2100 g of vinyl acetate, 2100 g of butyl acetate and 10.5 g of benzoyl peroxide, following the procedure outlined in Example 1 above, except that the period of addition of the solution was extended to 16 hours. An 80 per cent yield of polymer was obtained, all of which sprayed without evidence of cobwebbing.

Example 4

A mixture of 50 g vinyl acetate, 50 g di-n-butyl ether and 0.25 g benzoyl peroxide was polymerized by heating for two hours after the completion of the initial exothermic reaction. The polymer in this case was insoluble in the solvent and separated as a lower layer from which the solvent could be decanted. In spite of having separated from the diluent, the polymer sprayed without cobwebbing, although other experiments carried out under similar conditions but without a diluent have always given products which cobweb badly.

Example 5

Instead of using di-n-butyl ether as the solvent, we have polymerized vinyl acetate, as indicated in Example 4, using various other solvents, such as benzene, chlorobenzene, ethylene dichloride, ethyl methyl ketone, ethyl acetate, or ethyl alcohol. In no case did spray mixtures of the polymers exhibit any cobwebbing.

Example 6

A mixture of 25 g vinyl chloracetate, 0.25 g of benzoyl peroxide and 75 g ethyl acetate was heated in a water bath until the reaction started. A solution of 175 g vinyl chloracetate and 0.75 g benzoyl peroxide in 165 g ethyl acetate was then added slowly through a dropping funnel and the mixture refluxed for four hours. The bulk of the ethyl acetate was removed by heating on a steam bath, and the remainder by heating at 70° C. under a pressure of 50 mm for one hour. A 97% yield of polymer was obtained. The resin was clear and colorless, and soluble in acetone, ethyl acetate, butyl acetate, and other esters. When polymerized without a diluent, even in amounts as small at 25 g, a gel is formed which is insoluble in the above mentioned solvents.

Example 7

In place of ethyl acetate as the solvent for polymerization of vinyl chloracetate, butyl acetate has been substituted in the procedure of Example 6 without change in the properties or solubilities of the polymer.

Example 8

In place of vinyl chloracetate, we have substituted vinyl propionate and vinyl butyrate in the procedure of Example 6 and secured, when using solvents, polymers with wide solubilities and, when using no solvent, a product which is insoluble in all the common solvents.

Example 9

A mixture of 10 g of vinyl acetate, 10 g of vinyl chloracetate, 10 g of butyl acetate and 0.1 g benzoyl peroxide was heated in a water bath for a period of two hours. On evaporation of the solvent a light yellow resin was secured which had suitable solubilities for use in lacquers or enamels. When the reaction was carried out without employing butyl acetate but with all other conditions unchanged, the product was an insoluble gel which was worthless for use in protective finishes.

Furthermore, we have found that to obtain a polymer of styrene which does not cobweb, it is necessary to carry out the polymerization in the presence of both a catalyst and a solvent, and without allowing the temperature to rise above 140° C., in spite of the fact that styrene can be polymerized by heat alone without employing catalysts.

From the above description and examples it will be apparent that by polymerizing styrene in the presence of suitable solvents and in the presence of polymerization catalysts it is possible to avoid the production of insoluble products and to avoid the tendency of the product to cobweb when used in a spraying lacquer.

Although many solvents have been indicated above as being suitable for use in connection with our invention, other solvents such as esters or aromatic hydrocarbons in general are also suitable.

The soluble polymers formed in accordance with our invention may be embodied in a wide variety of spraying compositions of which the following is submitted as an illustrative example:

Example 10

| | Parts by weight |
|---|---|
| Meta styrene | 175 |
| Softener, tricresyl phosphate | 50 |
| Solvent, (15% benzene, 45% toluene, 40% xylene) | 500 |

As many apparently widely different embodiments of this invention may be made without departing from the spirit and scope thereof, it is to be understood that we do not limit ourselves to the specific embodiments thereof except as defined in the appended claims.

We claim:

1. The process of producing a polymer of styrene that is not subject to cobwebbing when admixed with a lacquer solvent and used for spraying which comprises polymerizing styrene in the presence of a polymerization catalyst and an aromatic hydrocarbon solvent.

2. The process of producing a polymer of styrene that is not subject to cobwebbing when admixed with a lacquer solvent and used for spraying which comprises polymerizing it in the presence of a polymerization catalyst and ethyl benzene.

In testimony whereof we affix our signatures.

WALTER E. LAWSON.
LLOYD T. SANDBORN.